US009084239B2

United States Patent
Funakubo et al.

(10) Patent No.: US 9,084,239 B2
(45) Date of Patent: Jul. 14, 2015

(54) WIRELESS COMMUNICATION APPARATUS, MOBILE WIRELESS COMMUNICATIONS CONTROL METHOD, AND WIRELESS STATION

(71) Applicant: FUJITSU LIMITED, Kawasaki-shi, Kanagawa (JP)

(72) Inventors: Toshiaki Funakubo, Kawasaki (JP); Kazumasa Ushiki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/972,511

(22) Filed: Aug. 21, 2013

(65) Prior Publication Data

US 2013/0343240 A1 Dec. 26, 2013

Related U.S. Application Data

(60) Division of application No. 12/552,951, filed on Sep. 2, 2009, now Pat. No. 8,547,882, which is a continuation of application No. PCT/JP2007/054563, filed on Mar. 8, 2007.

(51) Int. Cl.
*H04W 72/04* (2009.01)
*H04L 5/22* (2006.01)
(Continued)

(52) U.S. Cl.
CPC .............. *H04W 72/04* (2013.01); *H04L 5/22* (2013.01); *H04L 7/0083* (2013.01); *H04W 56/006* (2013.01)

(58) Field of Classification Search
CPC ............. H04W 72/04; H04J 3/06; H04J 3/00; H04B 7/212

USPC ......... 370/280, 503, 350, 337, 241; 455/503, 455/450, 522, 424
See application file for complete search history.

(56) References Cited

U.S. PATENT DOCUMENTS

| 5,257,404 A | 10/1993 | Goreham et al. |
| 5,956,330 A | 9/1999 | Kerns |

(Continued)

FOREIGN PATENT DOCUMENTS

| JP | 2235446 | 9/1990 |
| JP | 9008782 A | 1/1997 |

(Continued)

OTHER PUBLICATIONS

Non-final Office Action dated Sep. 4, 2012 received in U.S. Appl. No. 12/552,951.

(Continued)

*Primary Examiner* — Jamal Javaid
(74) *Attorney, Agent, or Firm* — Smith, Gambrell & Russell, LLP (57) ABSTRACT

A wireless communication apparatus for performing transmission and reception by using a Time Division Duplexing method is disclosed. The wireless communication apparatus includes a receiving part configured to output a timing signal based on a received timing signal, a transmitting part configured to transmit a timing signal based on the timing signal received by the receiving part, a control part configured to increase a reception opportunity for the receiving part to receive the timing signal and decrease a transmission opportunity for the transmitting part to transmit the timing signal as the accuracy of the timing signal received by the receiving part becomes lower.

2 Claims, 7 Drawing Sheets

(51) Int. Cl.
*H04L 7/00* (2006.01)
*H04W 56/00* (2009.01)

(56) References Cited

U.S. PATENT DOCUMENTS

| | | | |
|---|---|---|---|
| 6,154,661 | A | 11/2000 | Goldburg |
| 6,470,057 | B1 | 10/2002 | Hui et al. |
| 6,944,422 | B2 * | 9/2005 | Fitrandolph ............... 455/1 |
| 7,660,332 | B2 * | 2/2010 | Quijano ............... 370/516 |
| 7,835,343 | B1 * | 11/2010 | Reibel ............... 370/350 |
| 2001/0006508 | A1 | 7/2001 | Pankaj et al. |
| 2002/0064146 | A1 | 5/2002 | Okuyama |
| 2002/0098839 | A1 | 7/2002 | Ogino et al. |
| 2002/0193945 | A1 | 12/2002 | Tan et al. |
| 2004/0109475 | A1 | 6/2004 | Elam |
| 2006/0172751 | A1 | 8/2006 | Son et al. |
| 2007/0135115 | A1 | 6/2007 | Sawada |
| 2007/0286080 | A1 | 12/2007 | Kim et al. |
| 2007/0291673 | A1 | 12/2007 | Demirhan et al. |
| 2008/0008212 | A1 | 1/2008 | Wang et al. |
| 2009/0207780 | A1 * | 8/2009 | Kishigami et al. ............ 370/328 |
| 2012/0170537 | A1 | 7/2012 | Seo et al. |

FOREIGN PATENT DOCUMENTS

| | | |
|---|---|---|
| JP | 2002374265 | 12/2002 |
| JP | 2004500764 | 1/2004 |
| JP | 2005073240 | 3/2005 |
| JP | 2006074326 | 3/2006 |
| JP | 2006509423 | 3/2006 |
| JP | 2006140784 | 6/2006 |
| JP | 2007165998 | 6/2007 |

OTHER PUBLICATIONS

Final Office Action dated Feb. 6, 2013 received in U.S. Appl. No. 12/552,951.
International Search Report dated Jun. 19, 2007 received in International Application No. PCT/JP2007/054563.
Japanese Notice of Reason(s) for Rejection dated Oct. 25, 2011 issued in Application No. 2009-502411.
Notice of Allowance dated May 28, 2013 received in U.S. Appl. No. 12/552,951.
Non-final Office Action dated Jan. 30, 2012 received in U.S. Appl. No. 12/552,951.

* cited by examiner

WIRELESS COMMUNICATION APPARATUS, MOBILE WIRELESS COMMUNICATIONS CONTROL METHOD, AND WIRELESS STATION

CROSS-REFERENCE TO RELATED APPLICATIONS

This application is a divisional of U.S. patent application Ser. No. 12/552,951, filed Sep. 2, 2009, which is a continuation of International Application No. PCT/JP2007/054563, filed on Mar. 8, 2007, the entire contents of which are incorporated herein by reference.

FIELD

The embodiments discussed herein are related to a wireless communication apparatus, a mobile wireless data processing apparatus, and a wireless station that control transmission/reception periods of wireless communications between plural wireless stations (for example, control by using TDD (Time Division Duplexing).

BACKGROUND

There are various known methods for communicating between communications apparatuses, and various multiplexing communication methods are proposed in response to demands for achieving large capacity transmission.

For example, TDMA (Time Division Multiple Access), FDMA (Frequency Division Multiple Access), CSMA (Carrier Sense Multiple Access), and CDMA (Code Division Multiple Access) are known and are also used in wireless communications.

Further, various systems, in combination with the multiplexing communication methods, are known for achieving wireless communications between many mobile stations or between a base station and plural mobile stations.

A mobile phone system may have plural base stations allocated in a scattered manner so that service areas partly overlap each other. Thereby, communications between a mobile phone and other mobile phones or stationary telephones can be established while the mobile phone is being carried on the move, and the base stations can assign channels to each mobile phone.

Further, there is proposed a control method in which a mobile station requests a base station to assign a channel from a shared channel by using a CSMA/CA method, and the base station performs scheduling of transmission time by using TDMA (see, for example, Patent Document 1).

Further, there is proposed a system and a method that periodically divide a beacon region (where beacon packets are transmitted from plural master stations (stationary stations)), a TDMA region (where specific authorized stations use bandwidths assigned thereto), and a CSMA region (where competitive access is made) on a time-line and allow selection of a region enabling bandwidth guarantee (see, for example, Patent Document 2).

Patent Document 1: Japanese Laid-Open Patent Publication No. 2002-374265
Patent Document 2: Japanese Laid-Open Patent Publication No. 2005-73240

In a case where plural mobile stations perform wireless communications directly with other mobile stations, communication channels in a predetermined frequency bandwidth are to be assigned in a manner that the mobile stations do not interfere with each other.

In a case where a base station (stationary station) has almost all areas as its service areas, the base station (stationary station) can assign communication channels to mobile stations and control the communication channels. However, in a case where plural base stations are scattered at strategic locations along a path or the like or where the base station has an event site as its service area, a mobile station cannot receive the service of being assigned a communication channel unless the mobile station moves to a service area (hot spot) of the base station(s).

Accordingly, wireless communications between mobile stations are performed by using, for example, a slotted aloha method (in which frames and slots are synchronized between the mobile stations) and non-colliding communication channels are autonomously selected. Further, the slotted aloha method, for example, is used for establishing multiple access among mobile stations whereas the TDD (Time Division Duplexing) method, for example, is used for establishing wireless communications between mobile stations and base stations.

With this mobile wireless system, a mobile station determines the timing for performing transmission according to the TDD slot timing of a base station when the mobile station approaches the base station and communicates in synchronization with the TDD slot timing of the base station when the mobile station communicates with the base station.

However, in a case where no base station exists in the vicinity of a mobile station, the mobile station, unlike using a cellular wireless method in which the mobile station can obtain a slot timing signal from a base station, is required to continue to autonomously obtain the timing for synchronizing with the base station.

Therefore, there is conceived a synchronizing method in which accurate time data are obtained from a GPS (Global Positioning System) for synchronizing with the slot timing. In order to continue obtaining time data from radio-waves received from a GPS satellite, it is necessary to continue receiving radio-waves constantly from four or more GPS satellites in order to receive the time data.

In a case where the mobile station is located in an area where the status of receiving radio-waves from the GPS satellites is unsatisfactory, it is difficult for the mobile station to obtain time data from the radio-waves of the GPS satellites. Therefore, in some cases, it may be difficult to autonomously continue synchronization.

Further, in a case where no base station exists in the vicinity of a mobile station and the status of received radio-waves from GPS satellites is unsatisfactory, it is possible to perform wireless communications by using, for example, the slotted aloha method.

However, in order to efficiently perform wireless communications by making the length of time of a time slot (time slot length) used by the slotted aloha method substantially equal to the length of time of a time slot (time slot length) designated by TDD slot timing used by the base station according to the TDD method, it is necessary to receive radio-waves from GPS satellites and continue maintaining slot synchronization by obtaining accurate time data from the radio-waves.

In this case, it is often difficult for the mobile station to constantly obtain accurate time data. Accordingly, continuing to maintain synchronization of high accuracy is difficult, and wireless communications of other mobile stations may be obstructed by such difficulty.

SUMMARY

In order to achieve the object, there is provided a wireless communication apparatus for performing transmission and reception by using a Time Division Duplexing method, the wireless communication apparatus including: a receiving part configured to output a timing signal based on a received timing signal; a transmitting part configured to transmit a timing signal based on the timing signal received by the receiving part; a control part configured to increase a reception opportunity for the receiving part to receive the timing signal and decrease a transmission opportunity for the transmitting part to transmit the timing signal as the accuracy of the timing signal received by the receiving part becomes lower.

Further, in order to achieve the object, there is provided a wireless communication apparatus for performing transmission and reception by using a Time Division Duplexing method, the wireless communication apparatus including: a receiving part configured to output a timing signal based on a received timing signal; a transmitting part configured to transmit a timing signal based on the timing signal received by the receiving part; a control part configured to decrease a reception opportunity for the receiving part to receive the timing signal and increase a transmission opportunity for the transmitting part to transmit the timing signal as the accuracy of the timing signal received by the receiving part becomes lower.

Further, in order to achieve the object, there is provided a mobile wireless communications control method for controlling transmission/reception periods of wireless communications among a plurality of wireless stations by using a Time Division Duplexing method, the mobile wireless communications control method including the steps of: obtaining same time data of high accuracy from outside the wireless station; receiving a signal frame including at least a synchronization signal indicating a timing transmitted from another station and sub-data indicating a synchronization status; generating a synchronization signal according to the time data, the synchronization signal obtained from the other station, or a synchronization signal based on a self-propelled oscillation; storing sub-data indicating the synchronization status of the wireless station itself; transmitting a signal frame including the synchronization signal and the sub-data; initializing the synchronization signal and the sub-data of the wireless station itself when time data are obtained in the time data obtaining step; and updating the synchronization signal and the sub-data of the wireless station itself according to a result of comparing the sub-data received from the other station with stored sub-data of the wireless station itself.

DESCRIPTION OF EMBODIMENTS

Next, embodiments of the present invention are described with reference to the drawings.

With the below-described embodiments of a wireless communication apparatus, synchronization in accordance with high accuracy synchronization signals can be achieved. Furthermore, high accuracy synchronization can be achieved among plural wireless stations. Furthermore, wireless resources can be efficiently used.

<Configuration of Mobile Station and Base Station>

Figure 1:
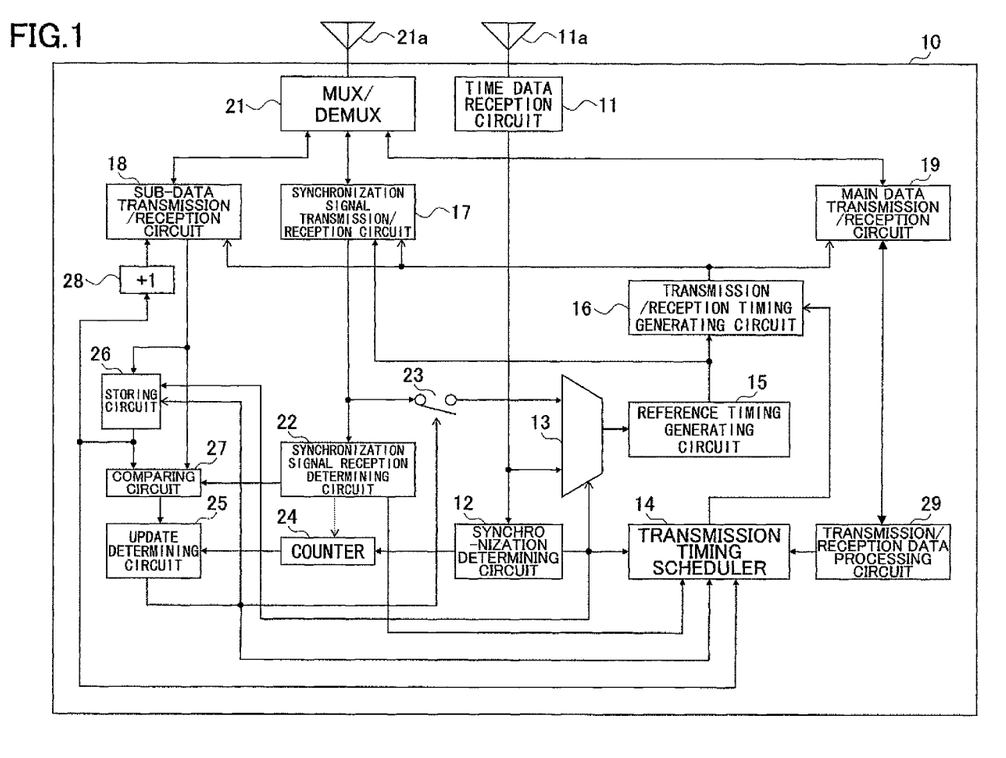
FIG. 1 is a block diagram of a configuration of a wireless station according to an embodiment of the present invention.

FIG. 1 is a block diagram illustrating a wireless station 10 according to an embodiment of the present invention. Although this wireless station 10 is illustrated having a configuration of a mobile station, the configuration may be applied not only to a mobile station but also to a base station.

In FIG. 1, a time data reception circuit 11 has a calculating function in which high accuracy time data are obtained by catching transmissions of a group of GPS satellites with an antenna 11a.

The time data reception circuit 11 catches the group of GPS satellites. For example, the time data reception circuit 11 receives signals including time data transmitted from four GPS satellites and performs slight adjustment of an inside oscillator, to thereby output high accuracy timing signals synchronized with the GPS satellites. The time data reception circuit 11 outputs the high accuracy timing signals to a synchronization determining circuit 12 and a selector 13. It is to be noted that, the outputting of high accuracy timing signals is stopped in a case where the high accuracy timing signals cannot be output due to a decrease in the number of GPS satellites that can be caught.

The synchronization determining circuit 12 determines whether high accuracy timing signals have been obtained from the time data reception circuit 11. For example, in a case where timing signals are output from the synchronization determining circuit 12, the synchronization determining circuit 12 determines that timing signals of high accuracy have been obtained. In the case where high accuracy timing signals are obtained (e.g., a case where time data are obtained by catching four GPS satellites), the selector 13 is controlled to select the timing signals output from the time data reception circuit 11. On the other hand, in a case where high accuracy timing signals are not obtained, the selector 13 is controlled to select synchronization signals (signals having less accuracy compared to timing signals from the time data reception circuit 11) provided from a switch 23. Further, the synchronization determining circuit 12 reports the obtaining of the high accuracy timing signals to a transmission timing scheduler 14 and a counter 24 and initializes a storing circuit 26 by storing a hop count of "0" in the storing circuit 26.

Because the selector 13 receives a report from the synchronization determining circuit 12 in a case where high accuracy timing signals have been obtained, the selector 13 selects the timing signals from the time data reception circuit 11 when receiving the report from the synchronization determining circuit 12. Other than such a case, the selector 13 selects synchronization signals from the switch 23. The selector 13 transmits the selected signals to a reference timing generating circuit 15.

The reference timing generating circuit 15 has a self-propelled clock oscillator. In order to generate a reference timing signal indicating the beginning of a frame in synchronization with the high accuracy timing signals or the synchronization signals input to the reference timing generating circuit 15, the reference timing generating circuit 15 resets the clock oscillator and the reference timing signal. In a case where neither the high accuracy timing signals nor the synchronization signals are input, the reference timing generating circuit 15 generates the reference timing signal by counting the output clock of the self-propelled clock oscillator. The reference timing signal is transmitted to a transmission/reception timing generating circuit 16 and a synchronization signal transmission/reception circuit 17.

The transmission timing scheduler 14 obtains a report indicating whether high accuracy timing signals have been obtained, a report indicating reception of synchronization signals, and a report indicating update of the hop count along with obtaining the hop count stored in the storing circuit 26. The transmission timing scheduler 14 determines the timing for transmitting a wireless frame (transmission interval) according to, for example, the hop count stored in the storing circuit 26 and reports the determined timing to the transmission/reception timing generating circuit 16.

Based on the reference timing signal from the reference timing signal generating circuit 15 and the transmission timing (transmission interval) from the transmission timing scheduler 14, the transmission/reception timing generating circuit 16 generates transmission/reception timing signals indicating the timing for transmitting/receiving a synchronization signal, sub-data (hop count), and a slot of its own station and transmits the transmission/reception timing signal indicating the synchronization signal to the synchronization signal transmission/reception circuit 17, the transmission/reception timing signal indicating the sub-data to a sub-data transmission/reception circuit 18, and the transmission/reception timing signal indicating a main data transmission/reception circuit 19.

A multiplexing/demultiplexing circuit (MUX/DMUX) 21 separates received wireless frames received by the antenna 21a and transmits the separated frames to the synchronization signal transmission/reception circuit 17, the sub-data transmission/reception circuit 18, and the main data transmission/reception circuit 19. The multiplexing/demultiplexing circuit (MUX/DMUX) 21 also multiplexes transmission signals from the synchronization signal transmission/reception circuit 17, the sub-data transmission/reception circuit 18, and the main data transmission/reception circuit 19 as wireless frames and transmits the multiplexed wireless frames to the antenna 21a.

Figure 2:
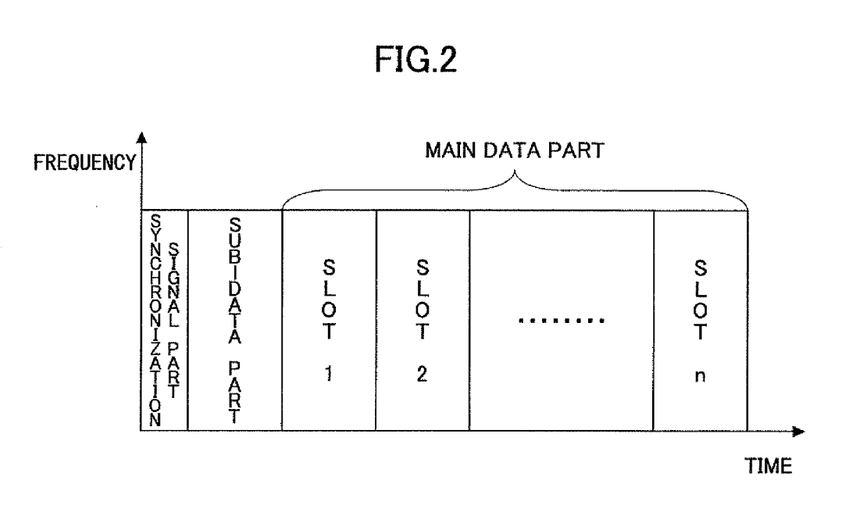
FIG. 2 is a diagram illustrating an embodiment of a frame format of a wireless frame.

FIG. 2 illustrates a frame format of an embodiment of a wireless frame. In FIG. 2, the horizontal axis represents time and the vertical axis represents frequency. For example, the wireless frame(s) is transmitted/received in frame periods of several milliseconds. A single wireless frame includes a synchronization signal part, a sub-data part (to which a hop count is set), and a main data part (including n slots being set with communication data that are to be reported from each mobile station to a corresponding mobile station).

In a case where a mobile station has communication data to be transmitted, the mobile station selects one of the n slots and sets the communication data to the selected slot (or a slot assigned to the mobile station). In a case where the mobile station has no communication data to be transmitted, the mobile station does not need to set main data. Thus, in this case, the mobile station may transmit a wireless frame only with a synchronization signal part and a sub-data part to which a hop count is set. Normally, a base station also transmits a wireless frame only with a synchronization signal part and a sub-data part to which a hop count is set.

The synchronization signal transmission/reception circuit 17 is for transmitting/receiving synchronization signal. The synchronization signal transmission/reception circuit 17 supplies received synchronization signals to a synchronization signal reception determining circuit 22 and the switch 23. The synchronization signal reception determining circuit 22 determines reception of a synchronization signal. In a case where the synchronization signal reception determining circuit 22 determines that a synchronization signal is received, the synchronization signal reception determining circuit 22 reports the reception of the synchronization signal to the below-described comparing circuit 27. In addition, the synchronization signal reception determining circuit 22 generates a signal for reporting the reception of the synchronization signal and transmits the signal to the transmission timing scheduler 14 and the counter 24.

The counter 24 is reset when receiving a signal indicating that a high accuracy timing signal has been obtained or a signal indicating that a synchronization signal has been received. Then, the counter 24 begins counting, for example, clock signals from the reference timing generating circuit 15, then generates a timeout signal after a predetermined time elapses, and then transmits the timeout signal to an update determining circuit 25.

In other words, in a case where the supply of high accuracy timing signals or synchronization signals is stopped, the timing signal generated by the reference timing generating circuit 15 becomes a self-propelled timing signal having low accuracy. Accordingly, the update determining circuit 25 is instructed to store "0xFFFF" ("0x" representing a hexadecimal digit"), indicating that the accuracy of the timing signal is lowest, in the storing circuit 26.

The predetermined time is determined according to the accuracy of the clock oscillator of the reference timing generating circuit 15. The predetermined time is preferred to be approximately a few hours where the accuracy of the clock oscillator is high and approximately a few minutes to a few ten minutes where the accuracy of the clock oscillator is low.

A sub-data transmission/reception circuit 18 transmits/receives sub-data (hop count) and supplies received hop counts to the storing circuit 26 and the comparing circuit 27. The hop count of the mobile station 10 itself is stored in the storing circuit 26. The hop count stored in the storing circuit 26 is transmitted to the comparing circuit 27 and the transmission timing scheduler 14. Further, "1" is added to a hop count by an adding circuit 28. Then, the hop count with "1" added is transmitted as sub-data to the sub-data transmission/reception circuit 18.

The adding circuit 28, however, does not add "1" in a case where the hop count stored in the storing circuit 26 is a first characteristic value "0" or a second characteristic value "0xFFFF". This is because the first characteristic value "0" indicates that a high accuracy timing signal has been obtained by the time data reception circuit 11 of the mobile station 10 itself and has no reason for a signal from another station to be hopped.

The comparing circuit 27 compares the hop count stored in the storing circuit 26 and the hop count newly received by the sub-data transmission/reception circuit 18 and supplies the comparison result to the update determining circuit 25. In a case where the newly received hop count is equal to or less than (or less than) the hop count stored in the storing circuit 26 or in a case where a timeout signal is received from the counter 24, the update determining circuit 25 generates an update control signal to cause the storing circuit 26 to update the hop count of the mobile station 10 itself by storing the received hop count and closes the switch 23 so that synchronization signals received in the synchronization signal transmission/reception circuit 17 are transmitted to the selector 13 in accordance with the updated hop count.

Accordingly, when the synchronization signal transmission/reception circuit 17 first receives a synchronization signal having a high hop count in a situation where GPS satellite signals cannot be caught, the first received synchronization signal is transmitted to the reference timing generating circuit 15. However, in a case where a subsequent synchronization signal is received immediately after receiving the first received synchronization signal and a relatively low hop count is detected from the subsequent synchronization signal, the subsequent synchronization signal can be transmitted to the reference timing generating circuit 15 after the first received synchronization signal is transmitted to the reference timing generating circuit 15 because the first received synchronization signal has low accuracy.

Further, the update determining circuit 25 transmits the update control signal to the transmission timing scheduler 14 to cause the transmission timing scheduler to reschedule the transmission timing.

The main data transmission/reception circuit 19 is for transmitting/receiving main data. The main data transmission/reception circuit 19 transmits received main data to a transmission/reception data processing circuit 29.

The transmission/reception data processing circuit 29 processes the received main data. In addition, the transmission/reception data processing circuit 29 transmits main data to be transmitted to other stations to the main data transmission/reception circuit 19.

The transmission/reception data processing circuit 29 may report the existence of main data to be transmitted to the transmission timing scheduler 14. The transmission timing scheduler 14 may determine the transmission timing (transmission interval) according to the existing main data to be transmitted.

<Operation Executed by Wireless Station>

Figure 3:
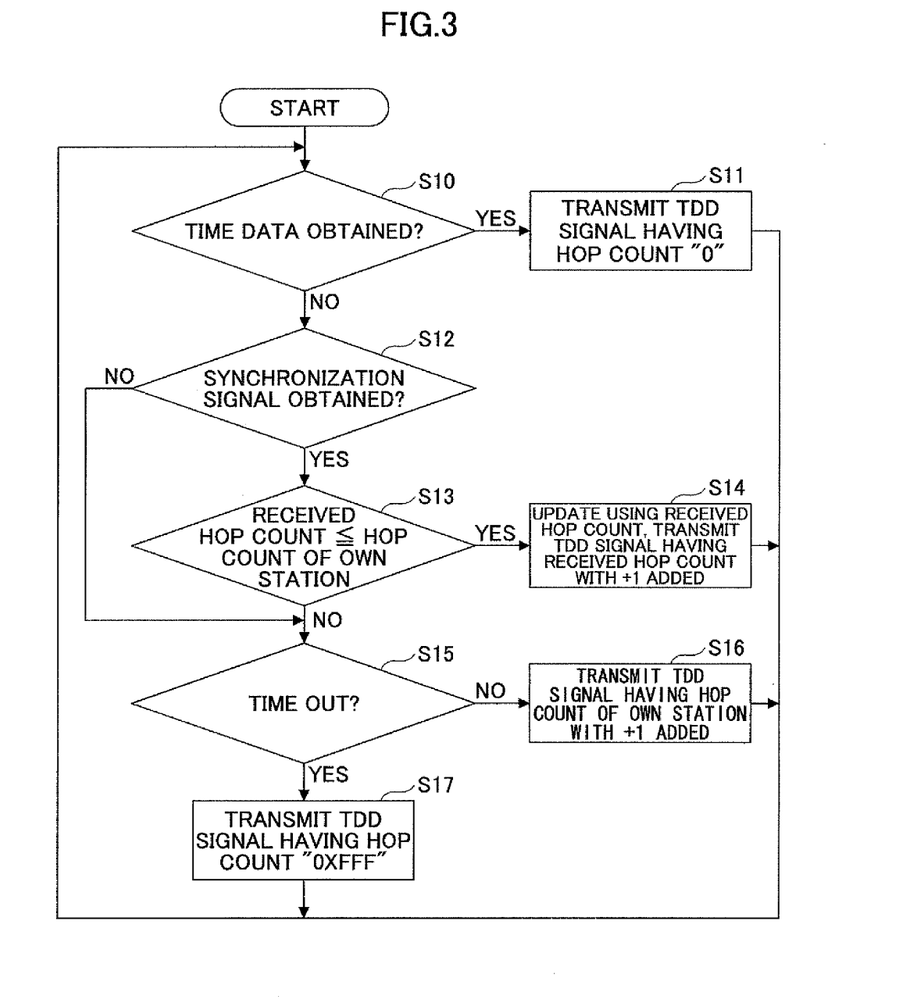
FIG. 3 is a flowchart of an operation executed by a mobile station.

FIG. 3 is a flowchart illustrating an operation executed by the wireless station 10. In Step S10 of FIG. 3, the synchronization determining circuit 12 determines whether a high accuracy timing signal is obtained. In a case where a high accuracy timing signal is obtained, a hop count "0" is stored in the storing circuit 26 and a wireless frame including the stored hop count "0" is transmitted as sub-data (hop count) in Step S11. In a case where the hop count is "0", no addition is performed in the adding circuit 28.

In a case where a high accuracy timing signal is not obtained, the synchronization signal reception determining circuit 22 determines reception of a synchronization signal in Step S12. In a case where a synchronization signal is received, the comparing circuit 27 compares the hop count stored in the storing circuit 26 with a hop count newly received, along with the reception of the synchronization signal, by the sub-data transmission/reception circuit 18 and determines whether the received hop count is equal to or less than the stored hop count in Step S13. Alternatively, it may be determined whether the received hop count is less than the stored hop count.

In a case where the received hop count is equal to or less than the stored hop count, the update determining circuit 25 updates the hop count by storing the received hop count in the storing circuit 26 and transmits a wireless frame, having "1" added to the stored hop count by the adding circuit 28, as sub-data (hop count).

On the other hand, in a case where the received hop count is greater than the stored hop count in Step S13 or where no synchronization signal is received in Step S12, the operation proceeds to Step S15 in which the update determining circuit 25 determines whether a timeout signal is transmitted from the counter 24.

In a case where no timeout signal is transmitted, the operation proceeds to Step S16 in which the self-propelled reference timing generating circuit 15 generates a reference timing signal and transmits a wireless frame, having "1" added to the stored hop count by the adding circuit 28, as sub-data (hop count).

In a case where a timeout signal is transmitted, the operation proceeds to Step S17 in which the self-propelled reference timing generating circuit 15 generates a reference timing signal, causes the storing circuit 26 to store a second characteristic value "0xFFFF", and transmits a wireless frame including the characteristic value "0xFFFF" as sub-data (hop count). In a case where the hop count is "0xFFFF", no addition is performed by the adding circuit 28.

<Hop Count of each Mobile Station>

Figure 4:
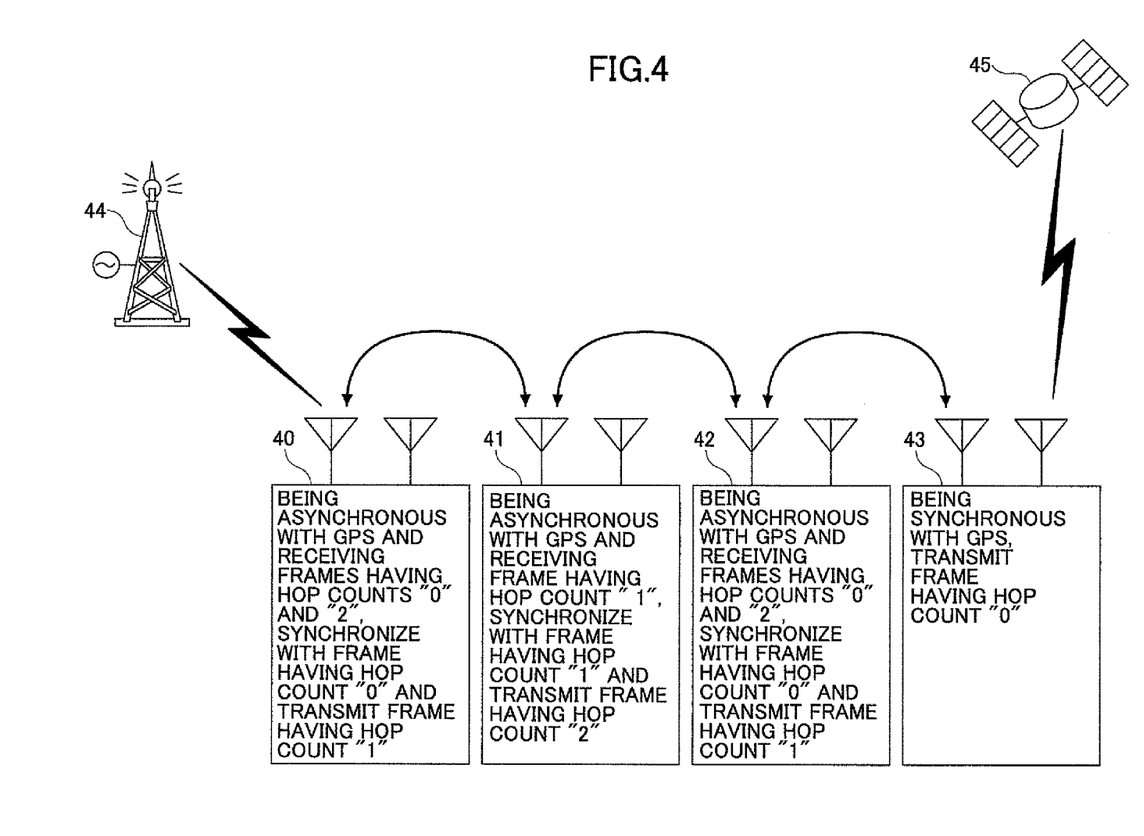
FIG. 4 is a diagram for explaining the number of hops of each mobile station of a wireless mobile communication control method according to an embodiment of the present invention.
Figure 5:
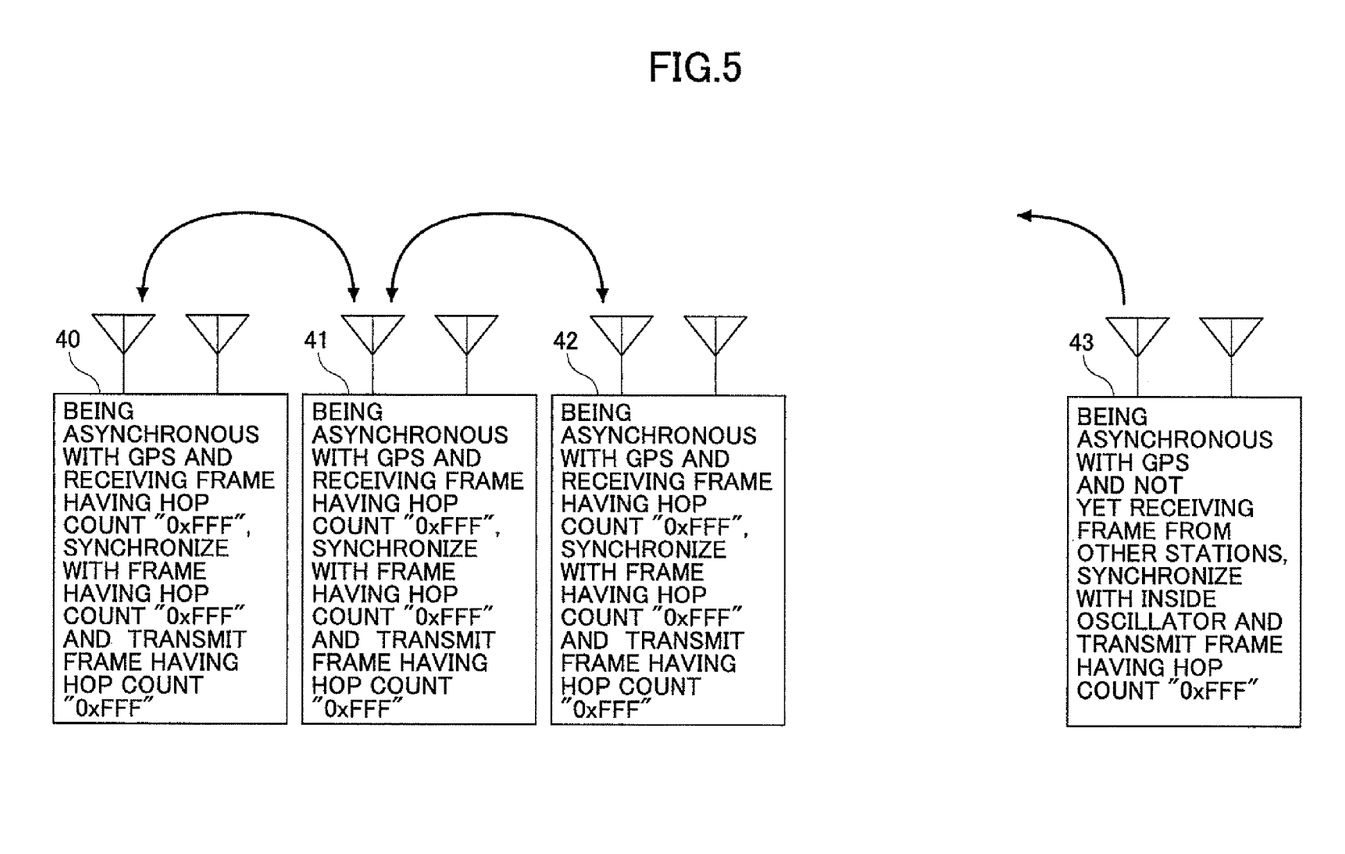
FIG. 5 is another diagram for explaining the number of hops of each mobile station of a wireless mobile communication control method according to an embodiment of the present invention.

FIGS. 4 and 5 are drawings for describing the hop count of each mobile station of a mobile wireless communication control method according to an embodiment of the present invention.

In FIG. 4, a mobile station 40 is in a GPS asynchronous state in which high accuracy timing signals cannot be obtained from a GPS satellite. The mobile station 40 receives a wireless frame transmitted from a base station 44 and a wireless frame transmitted from a mobile station 41. Because the base station 44 is synchronous with the GPS satellite, a wave clock, or a clock based on a high accuracy frequency source, the base station 44 transmits a wireless frame having a hop count of "0". Further, the mobile station 41 transmits a wireless frame having a hop count of "2".

In other words, because the mobile station 40 is receiving a wireless frame having a hop count "0" and a wireless frame having a hop count "2", the mobile station 40 subordinately synchronizes with the wireless frame having a smaller hop count of "0" and transmits a wireless frame having a hop count of "1".

The mobile station 41 is in a GPS asynchronous state in which the mobile station 41 receives a wireless frame, transmitted from the mobile station 40, having a hop count "1" and a wireless frame, transmitted from the mobile station 42, having a hop count "1". Therefore, the mobile station 41 subordinately synchronizes with the wireless frame, transmitted from the mobile station 40, having a hop count "1" and transmits a wireless frame having a hop count "2".

The mobile station 42 is in a GPS asynchronous state in which the mobile station 42 receives a wireless frame, transmitted from a mobile station 43, having a hop count of "0" and a wireless frame, transmitted from the mobile station 41, having a hop count of "2". Therefore, the mobile station 42 subordinately synchronizes with the wireless frame, transmitted from the mobile station 43, having a hop count of "0" and transmits a wireless frame having a hop count "1".

Because the mobile station 43 is in a GPS synchronous state in which the mobile station 43 can obtain high accuracy timing signals from the GPS satellite 45, the mobile station 43 transmits a wireless frame having a hop count of "0".

In FIG. 5, the mobile station 40 is in a GPS asynchronous state in which the mobile station 40 receives a wireless frame, transmitted from the mobile station 41, having a hop count of "0xFFFF". Therefore, the mobile station 41 subordinately synchronizes with the wireless frame having a hop count of "0xFFFF" and transmits a wireless frame having a hop count of "0xFFFF".

The mobile station 42 is in a GPS asynchronous state in which the mobile station 42 receives a wireless frame, transmitted from the mobile station 41, having a hop count of "0xFFFF". Therefore, the mobile station 42 subordinately synchronizes with the wireless frame having a hop count of "0xFFFF" and transmits a wireless frame having a hop count of "0xFFFF".

The mobile station 43 is in a GPS asynchronous state and receives no wireless frames from other mobile stations. Therefore, the mobile station 43 synchronizes with a reference timing signal generated from the self-propelled reference timing generating circuit 15 and transmits a wireless frame having a hop count of "0xFFFF".

<Transmission Timing of each Mobile Station>

Each mobile station achieves duplex communications of synchronization signals and sub-data (hop count) using wireless frames. The timing of the communications is determined according to the hop count of the wireless frame to be transmitted, that is, the hop count output from the adding circuit 28. The hop count stored in the storing circuit 26 may be used instead of the hop count output by the adding circuit 28.

In a case where the hop count is "0", there is no need for a mobile station to receive synchronization signals. Therefore, the mobile station 42 transmits a synchronization signal and sub-data, for example, every single frame. In a case where the hop count is equal to or greater than "1", it is necessary for the mobile station to transmit a synchronization signal while monitoring synchronization signals of other stations. Therefore, the mobile station repeats transmission and reception in a predetermined frame period (e.g., once every two frames). This period is controlled according to the hop count. Typically, in a case where "M" represents a transmission period when the hop count is "0" and "N" represents a transmission period when the hop count is equal to or greater than "1", "N" is set to be greater than "M" (M<N).

In other words, with a mobile station that performs transmission and reception by using a TDD method, in a case of obtaining reference timing signals from the time data reception circuit 11 and the synchronization signal transmission/reception circuit 17 and transmitting synchronization timing signals from the synchronization signal transmission/reception circuit 17 according to the obtained reference timing signals, the opportunity for allowing the synchronization signal transmission/reception circuit 17 to receive synchronization timing signals increases and the opportunity for allowing the synchronization signal transmission/reception circuit 17 to transmit synchronization timing signals decreases as the accuracy of the received synchronization timing signal becomes lower. The control of the transmission opportunity and the reception opportunity may not only be performed temporarily but also continuously.

In a case of a system laying weight on expansion of master/slave synchronization areas, a mobile station having high reliability lays weight on transmission of synchronization signals. Therefore, a mobile station having a hop count "1" transmits wireless frames (including a synchronization signal part) in odd number frames and receives wireless frames (including a synchronization signal part) in even number frames. In other words, the mobile station performs communications by switching between transmission and reception of wireless frames in 1 frame periods.

A mobile station having a hop count "2" switches between transmission and reception of wireless frames, for example, by transmitting wireless frames including synchronization signals in a first frame and receiving wireless frame in second and third frames. Further, a mobile station having a hop count "3" switches between transmission and reception of wireless frames, for example, by transmitting wireless frames including synchronization signals in a first frame and receiving wireless frames in second, third, and fourth frames. Alternatively, the switching between transmission and reception of wireless frames may be performed in 2 frame periods.

In this embodiment, the opportunity for transmission is set to be greater than the opportunity for reception in a case where high accuracy timing signals are obtained. Alternatively, the opportunity for transmission may be set to be greater than the opportunity for reception in a case where the amount of data to be transmitted is large. Accordingly, the opportunity for transmission can be increased for mobile stations having large amounts of data, and the opportunity for reception by other mobile stations increases. Accordingly, the probability for success of reception increases.

In this case, by intentionally setting the hop count to a low value of, for example, "0" or "1", it becomes easier to be used as a timing signal. Accordingly, increase in the probability of successful reception can be expected. Instead of setting the hop count to a predetermined value (e.g., "0" or "1"), transmission may be performed by subtracting a predetermined value (e.g., "1", "2", or "3").

Alternatively, in a case where "M" represents a transmission period when the hop count is "0" and "N" represents a transmission period when the hop count is equal to or greater than "1", "N" is set to be less than "M" (M>N). This is effective for a case where weight is placed on improving reliability.

In such a system placing weight on improving reliability, the greater the weight that is placed on reception of wireless frames, the higher the reliability of the mobile station. Thus, wireless frames equivalent to the number of hop counts are transmitted with respect to reception of a wireless frame of a single frame. In terms of mobile stations having a hop count of "0" or "1", the transmission periods are the same as the expanding of the master/slave synchronization area.

A mobile station having a hop count "2" switches between transmission and reception of wireless frames, for example, by transmitting wireless frames including synchronization signals in first and second frames and receiving a wireless frame in a third frame. Further, a mobile station having a hop count "3" switches between transmission and reception of wireless frames, for example, by transmitting wireless frames including synchronization signals in first, second, and third frames and receiving a wireless frame in a fourth frame. Alternatively, the switching between transmission and reception of wireless frames may be performed in 2 frame periods.

Whether to use a system laying weight on the expansion of master/slave areas or a system laying weight on improvement of reliability depends on the application used for the system. The proportion between transmission of wireless frames and reception of wireless frames may not only be determined in proportion with the hop count. For example, the proportion between transmission of wireless frames and reception of wireless frames may be determined according to a weighted hop count or according to a given function having the hop count as a variable.

Figure 6:
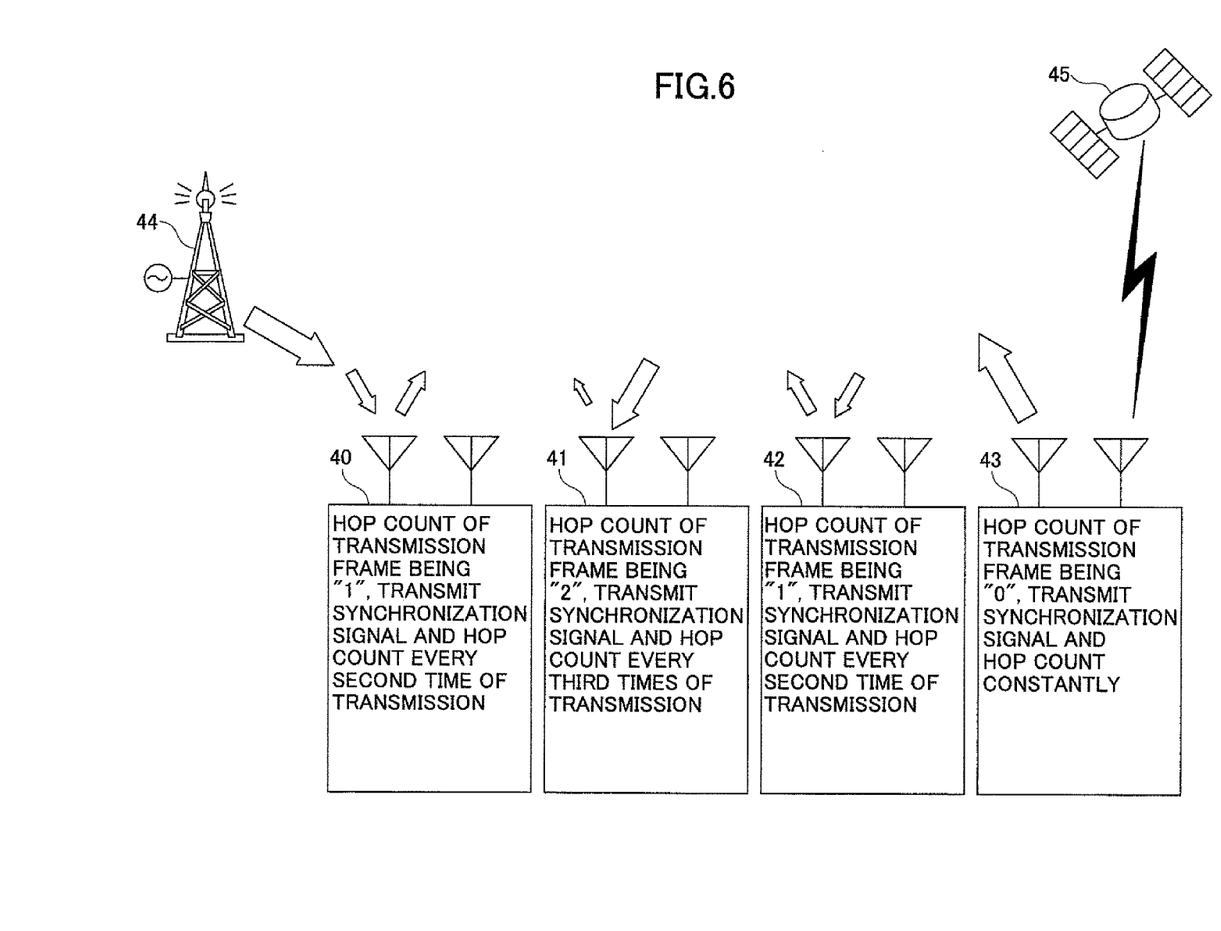
FIG. 6 is a diagram for explaining a system focusing on expansion of a subordinate synchronization area according to an embodiment of the present invention.

FIG. 6 is a schematic diagram for describing a transmission timing of each mobile station in a system laying weight on expanding the master/slave area according to an embodiment of the present invention. In FIG. 6, each mobile station 40-43 is in the same state as those illustrated in FIG. 4. In this embodiment, the mobile station 40 transmits a wireless frame having a hop count "1", and the mobile station 43 transmits a wireless frame having a hop count "0".

Because the hop count is "1" for each of the mobile stations 40, 42, the transmission timing scheduler 14 of each mobile station 40, 42 transmits wireless frames in odd number frames and receives wireless frames in even number frames.

Because the hop count is "2" for the mobile station 41, the timing scheduler 14 of the mobile station 41 transmits wireless frames in the first frame and receives wireless frames in second and third frames. Because the hop count is "0" for the mobile station 43, the timing scheduler 14 of the mobile station 43 transmits wireless signals in every frame.

<Transmission Method of Sub-Data>

Figure 7A:
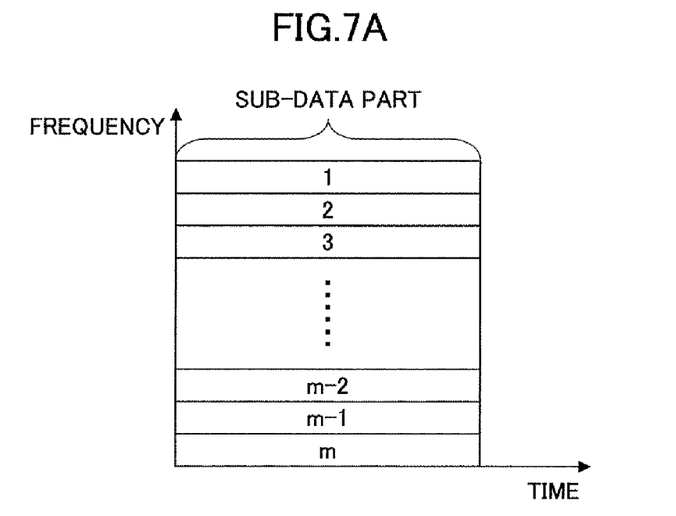
FIGS. 7A and 7B are diagrams for describing a configuration of a sub-data part of each embodiment of the present invention.
Figure 7B:
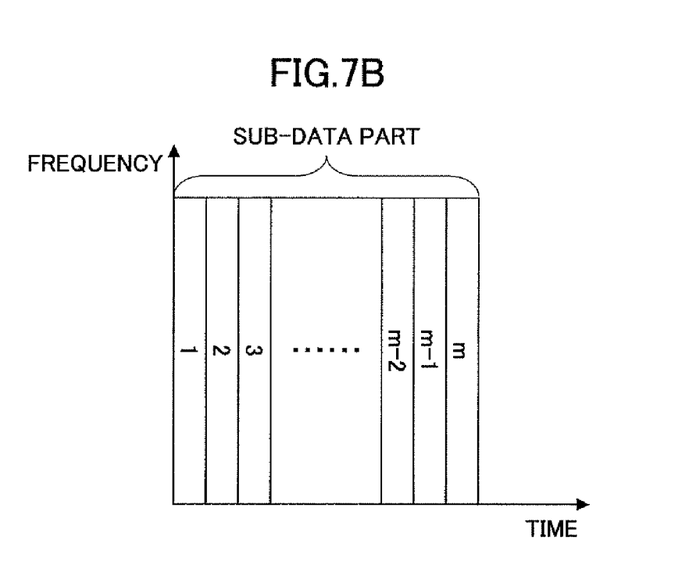

As illustrated in FIG. 7A, the sub-data part of FIG. 2 may be configured to indicate hop counts "1" through "m" by making one or "i" ("i" being an integer equal to or greater than 2) carriers to correspond to a single hop count (value of hop count). As illustrated in FIG. 7B, the sub-data part may be configured to indicate hop counts "1" through "m" by dividing the sub-data part into "m" time slots and making one time slot number correspond to a single hop count (value of hop count). Further, the sub-data part may be configured to indicate the value of hop counts according to the combination of the above-described carriers and time slots.

In a case of performing operations using the configurations illustrated in FIG. 7A or FIG. 7B, it is necessary for the sub-data transmission/reception circuit 18 to supply hop counts to the synchronization signal transmission/reception circuit 17.

Further, in order to efficiently transmit sub-data (i.e. hop count), a preamble may be used as the synchronization signal part of FIG. 2 as described in, for example, WiMAX (Worldwide Interoperability for Microwave Access) of IEEE 802.16e. Because the preamble has an index and the code pattern of the preamble is different depending on the index number of the preamble, the index can be used to select a preamble having an index number matching the number of hop counts. In this case, the sub-data part of FIG. 2 can be eliminated because hop counts can be received/transmitted with the synchronization signal part (preamble) of FIG. 2.

According to related art examples where a mobile station cannot obtain high accuracy timing signals or where the mobile station cannot synchronize with a base station, the slot timings of wireless frames among mobile stations become asynchronous and result in increase of communication interference among mobile stations. However, with the above-described embodiments of the present invention, mobile stations can subordinately synchronize with mobile stations receiving high accuracy GPS timing signals or synchronization signals of a base station, to thereby achieve a pseudo-expansion of the synchronization area. Further, with the sub-data (hop count of subordinate synchronization), mobile stations can subordinately synchronize with a synchronization source with higher accuracy. Thus, synchronization among plural wireless stations can be continued and wireless resources can be used efficiently.

What is claimed is:

1. A wireless communication apparatus for performing transmission and reception, the wireless communication apparatus comprising:

a receiver configured to receive a reception timing signal and output a first timing signal based on the reception timing signal;

a transmitter configured to transmit the first timing signal output from the receiver;

a controller configured to determine an accuracy of the reception timing signal and increase a reception opportunity for the receiver to receive the reception timing signal and decrease a transmission opportunity for the transmitter to transmit the first timing signal as the accuracy of the reception timing signal received by the receiver becomes lower, wherein the reception timing signal received by the receiver includes time information of a high accuracy time source, wherein the receiver is configured to add sub-data including a value indicating the accuracy of the reception timing signal to the first timing signal and output the first timing signal added with the sub-data, wherein the controller is configured to determine the accuracy of the reception timing signal in accordance with the value of the sub-data, and wherein the transmitter and receiver are configured to use Time Division Duplexing.

2. A wireless communication apparatus for performing transmission and reception, the wireless communication apparatus comprising:

a receiver configured to receive a reception timing signal and output a first timing signal based on the reception timing signal;

a transmitter configured to transmit the first timing signal output from the receiver;

a controller configured to determine an accuracy of the reception timing signal and decrease a reception opportunity for the receiver to receive the reception timing signal and increase a transmission opportunity for the transmitter to transmit the first timing signal as the accuracy of the reception timing signal received by the receiver becomes lower, wherein the reception timing signal received by the receiver includes time information of a high accuracy time source, wherein the receiver is configured to add sub-data including a value indicating the accuracy of the reception timing signal to the first timing signal and output the first timing signal added with the sub-data, wherein the controller is configured to determine the accuracy of the reception timing signal in accordance with the value of the sub-data, and wherein the transmitter and receiver are configured to use Time Division Duplexing.

* * * * *